Aug. 6, 1940.   A. H. NEULAND   2,209,996
INTERNAL COMBUSTION ENGINE
Filed Dec. 22, 1937   3 Sheets-Sheet 1

INVENTOR
Alfons H. Neuland

Aug. 6, 1940.   A. H. NEULAND   2,209,996
INTERNAL COMBUSTION ENGINE
Filed Dec. 22, 1937   3 Sheets-Sheet 2

INVENTOR
Alfons H. Neuland
BY
ATTORNEY

Aug. 6, 1940.  A. H. NEULAND  2,209,996
INTERNAL COMBUSTION ENGINE
Filed Dec. 22, 1937   3 Sheets-Sheet 3
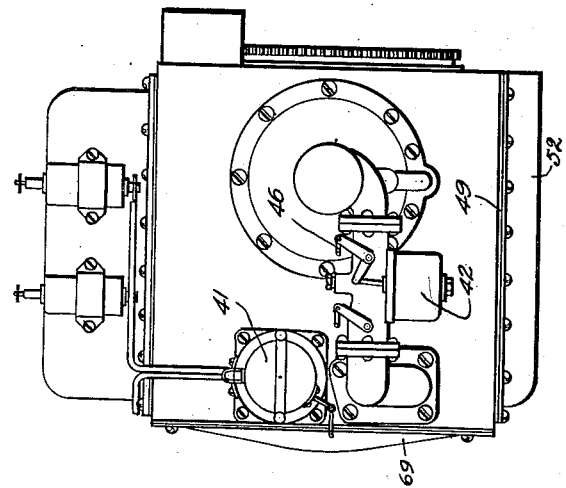
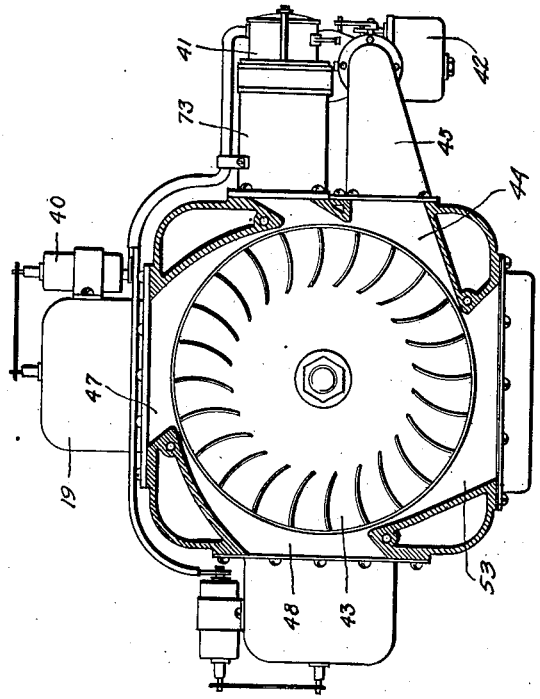
INVENTOR
Alfons H. Neuland
BY
ATTORNEY Patented Aug. 6, 1940

2,209,996

UNITED STATES PATENT OFFICE 2,209,996

INTERNAL COMBUSTION ENGINE

Alfons H. Neuland, Irvington, N. J.

Application December 22, 1937, Serial No. 181,086

2 Claims. (Cl. 123—171)

My invention consists in the construction, combination and arrangement of the various parts of my improved devices as described in the specification, claimed in my claims and illustrated in the accompanying drawings showing a preferred embodiment, and in which:

Fig. 3 is a side elevation showing the arrangement of the carburetor, auxiliary generator and ignition equipment.

Fig. 4 is a front elevation, partly in section, showing the fan housing and distribution of air to the cooling chambers, oil pan, carburetor and auxiliary generator.

Figure 1:
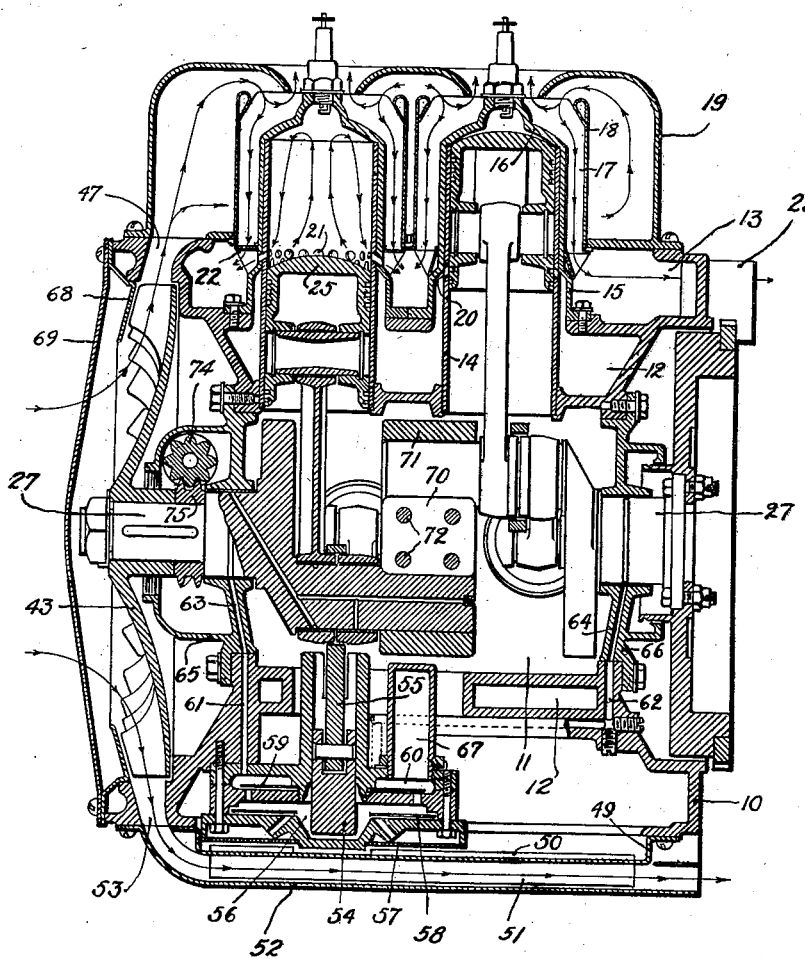
Fig. 1 is a longitudinal vertical section, of one embodiment of my improved engine showing particularly the flow of the charging fluid, the exhaust gases and the cooling air.
Figure 2:
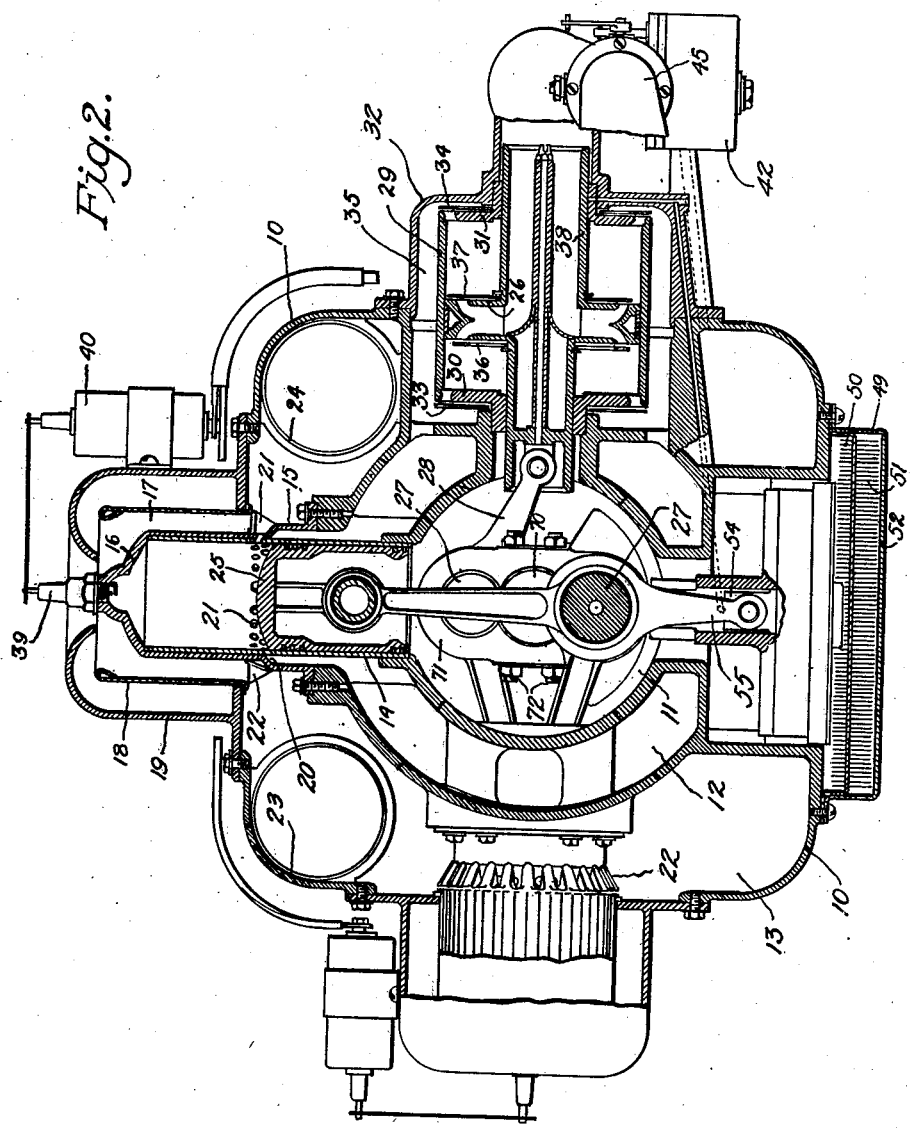
Fig. 2 is a partial cross section thru the engine in Fig. 1 with parts broken away to show the corrugated type of exhaust nozzle at the left, the oil pump, the fluid charging pump and their connection with the crankshaft.

Referring to the accompanying drawings and particularly to Figs. 1 and 2, the reference numeral 10 designates the engine casing preferably cast from aluminum or other light metal in one piece. The casing is shaped to form a crank chamber 11, an induction or charging chamber 12 and an exhaust chamber 13 and to accommodate two pairs of cylinder elements, the cylinders in each pair having an angular spacing of 90°. Each cylinder element consists of a sleeve or liner 14 which may be formed separate from and secured to the barrel or element 15 by suitable means such as press fitting, welding or hard soldering. One end of the cylinder element is provided with a head 16 and a plurality of axial cooling ducts or chambers formed by a large number of closely spaced metal strips or fins 17 and by a thin sleeve 18 arranged to encircle the cylinder and the fins. After assembly, the fins are permanently joined with the cylinder element by hard soldering in a furnace with controlled reducing gas atmosphere at a temperature ranging from 1400 to 2100 deg. F. depending on whether silver, brass alloy or copper solder is used. Solder in the form of wire, strip or a thin sheet is applied adjacent to all parts to be joined, preferably during assembly, and serves after treatment in the furnace not only to provide a strong bond between the cylinder element and the fins but also as an efficient medium to transfer heat from the cylinder barrel to the cooling fins. With this construction I am able to secure a close spacing of the fins at low cost, a much greater cooling area than is possible with cast or machined fins and increased power output in instances where temperature is the limiting factor. The cylinder elements are securely bolted to the engine casing and provide closures for the induction chamber 12. The cover or housing 19 for each cylinder bank serves as a closure for the exhaust chamber 13 and forms an air jacket or chamber around the cylinders from which air is supplied to the cooling ducts 10 of the cylinders.

According to my invention each cylinder is charged from the induction chamber by a series of induction ports 20 arranged around preferably the entire periphery of the cylinder, and the burnt gases are expelled thru a plurality of exhaust ports 21 also arranged around preferably the entire periphery of the cylinder and adjacent to said induction ports but opening into the exhaust chamber. The cylinder cooling ducts formed by the fins 17 also open into the exhaust chamber in close proximity to the exhaust ports. I also provide a cooling air impelling, or exhaust nozzle 22 interposed between the cooling duct openings and the exhaust ports to establish intimate contact between the exhaust blast and the stream of cooling air emerging from the cooling ducts. The preferred form of nozzle shown in Figs. 1 and 2 consists of a thin washer or ring encircling the cylinder shaped to form a corrugated or wavy edge facing the exhaust chamber. With this arrangement the exhaust gases are blasted into the exhaust chamber in a thin stream or streams and form a strong vacuum in the adjacent grooves facing the cooling ducts. Cooling air is thereby drawn thru the ducts at high velocity, impinged on the nozzle surface, mixed with the exhaust gases as it leaves the nozzle, impelled into the exhaust chamber and expelled from the engine casing thru the pipes 23 and 24. This arrangement also serves to slow down and to cool the exhaust gases, effectively muffles the exhaust noise and prevents overheating of the engine casing. It should be noted that even though the exhaust nozzle openings are narrow the aggregate section of the nozzle opening is considerable and may be made to equal that of the exhaust ports in the cylinder. As a result the cylinder can be rapidly exhausted and without excessive velocities thru, and heat transfer to, the nozzles. A maximum amount of kinetic and heat energy is thus transferred to the cooling air stream. The aggregate section of the nozzle opening facing the cooling ducts may also be made to approximate the combined section of the cooling ducts to facilitate the flow of cooling air during the periods when the exhaust ports are closed. With this arrangement cooling of the engine cylinders varies not only with the speed of the engine but also with the changes in load and is approximately proportional to the amount of fuel burned in the cylinders. The nozzle 22 is also effectively cooled by the stream of cooling air from the ducts impinging upon it. It will be seen that after the cylinder has been nearly exhausted and the velocity of the exhaust gases thru the nozzle is less than that of the cooling air flowing past the nozzle, the cooling air establishes a partial vacuum in the exhaust nozzle and tends to maintain the flow of exhaust gases out of the cylinder, and in instances when a vacuum forms in the cylinder in excess of that induced by the flow of cooling air at the nozzle, a part of the cooling air may enter thru the nozzle and mix with the charging fluid in the cylinder.

The exhaust and induction ports are arranged so that the piston 25, as it nears the end of the expansion stroke uncovers the exhaust ports and permits the bulk of the burnt gases to escape before uncovering the induction ports. By means of my construction and arrangement of oppositely positioned induction ports, the charging fluid is sucked into or, by auxiliary means is blown into the cylinder from opposite sides to join in the central portion and to form a nucleus which expands outwardly and forces any remaining exhaust gases toward the cylinder wall and in the direction of and out thru the exhaust ports.

In order to fully charge the cylinders and to supercharge them at high engine speeds I provide a displacement device, preferably connected with and driven from the crankshaft for supplying the cylinders with a definite quantity of charging fluid per revolution. The displacement device or fluid pump illustrated in Fig. 2 consists of a hollow piston 26 connected to the crankshaft 27 by the connecting rod 28. The piston operates within a cylinder 29 which is supported and kept in position at its ends by heads 30 and 31. The heads are fitted within the engine casing and cover 32 and are notched at their outer periphery to form a large number of exhaust ports normally covered by thin metal disk valves 33 and 34 provided with a plurality of inwardly extending radial prongs adapted to flex and to open the exhaust ports when the fluid pressure in the cylinder exceeds that in the induction chamber 12 with which the outer pump chamber 35 is connected. The pump piston 26 is provided with flat valves 36 and 37, similar to the valves 33 and 34, which cover and close the large number of intake ports, arranged in the face of the piston, whenever pressure develops in the pump cylinder.

Charging fluid is drawn into the hollow piston thru the piston sleeve 38 and alternately thru the valves 36 and 37 into the cylinder, and is expelled into the outer pump chamber and into the induction chamber 12 thru the disk valves 33 and 34. The displacement pump thus serves to meter and supply a predetermined maximum quantity of charging fluid to the cylinders per revolution and develops the necessary pressure to force it into the cylinders.

While the illustrated engine is provided with spark plugs 39, high tension coils 40, breaker mechanism 41 and a carburetor 42 for operation with a gaseous mixture, the engine may instead be provided with equipment such as an injector and fuel pump suitable for operating it with compression ignition; or it may be operated, if desired, in still other ways without departing from the spirit of my invention.

As the engine speed increases the period, during which the cylinder must be exhausted and freshly charged, is shortened and the pressure developed by the fluid pump increases sufficiently to force the quantity of fluid delivered by it into the cylinders. Since, as heretofore set forth, the exhaust ports in and nozzles associated with the cylinder are proportioned for a moderate loss of heat to the cylinders, the importance of the drag exerted by the cooling air stream upon the exhaust gases to build up an increased induction pressure will be appreciated particularly because it substantially does not interfere with the exhaust of the bulk of the burnt gases during the period when the exhaust pressure is high, but becomes increasingly effective during the induction period when the pressure in the cylinder is relatively low. The extra energy required by the induction pump to produce the higher induction pressure is partly recovered and transferred to the cooling air stream by the increased velocity of the exhaust gases thru the exhaust nozzle during the induction period.

When the engine is equipped for liquid fuel injection the capacity of the induction pump may be made considerably greater than the combined capacity of the power cylinders, the excess air serving to cool the inside walls of the cylinder and piston, and as it is blown thru the exhaust nozzle to impel the external stream of cooling air.

As heretofore mentioned the disk valves associated with the induction pump are very thin. They have but little inertia and are adapted to open and close rapidly and in response to slight pressure differences. The large aggregate section of the intake and of the exhaust ports, made possible by their arrangement at or near the periphery of the cylinder, facilitates the flow of fluid into and out of the cylinder at moderate velocities and makes the pump suitable for operation at high speed.

While the volumetric efficiency of the induction pump is relatively high it decreases with increasing engine speed and in order to counteract this tendency I provide a blower having an impeller 43 driven by and preferably directly mounted on the shaft 27 and disposed within the engine casing 10. The blower housing is arranged to form a plurality of exhaust chambers around its outer periphery, the chamber 44 being connected to the central intake port of the induction pump by means of the tube 45 and carburetor 42. Since the blower pressure increases with engine speed, it may be proportioned to compensate for any drop of volumetric efficiency or so as to increasingly supercharge the induction pump and power cylinders as the engine speed increases. The flow of charging fluid into the cylinders is controlled in conventional manner by the throttle 46.

The blower housing is provided with another chamber 47 which exhausts into the cover housing 19 and into the cylinder cooling chamber or ducts at a pressure which increases with engine speed and supplies an extra quantity of cooling air to compensate for the greater friction losses at such higher engine speeds. The horizontal bank of power cylinders is in like manner supplied with air from the chamber 48.

I also provide means for effectively cooling the engine lubricating oil with air under pressure supplied by the blower consisting of an oil pan 49 having a series of internal fins 50 and a series of external closely spaced fins 51 attached to its bottom. A cover 52 is fitted over the external fins and over still another exhaust chamber 53 in the blower housing and serves to direct air under pressure thru the cooling fin ducts. With this relatively simple arrangement a substantial amount of heat from the engine bearings is carried away in the cooling air stream and may be employed to heat the interior of a vehicle or for other purposes.

In order to secure compactness, simplicity of construction and quiet operation I provide a special reciprocating oil pump. The pump consists of a plunger 54 connected to the forward crank of the engine shaft by the connecting rod 55. Oil is drawn into the lower pump chamber 56 thru the filtering screen 57 and past the disk valve 58 during the suction stroke and thereafter forced past another disk valve 59 into the pressure chamber 60 from which it is distributed to ducts 61 and 62 in the engine housing and ducts 63 and 64 in the bearing brackets 65 and 66 respectively to the crankshaft journals. The pressure chamber of the oil pump is provided with an upright chamber 67 in which a quantity of air is trapped and which serves to equalize the oil pressure.

I further provide a specially assembled crankshaft 27 in order to permit the use of one piece connecting rods and bearings and to secure certain other advantages. It consists of two main parts each provided with a main journal, a counter weight and a crank. The cranks are extended beyond their journal surfaces and the extensions on their inner sides are bored out concentric with the main journals and to the same dimension as the round plug 70 interposed between crank extensions. The clamp 71 is provided with oppositely positioned holes ground to the same diameter as the crankpins and may have any desired angular spacing which in the present instance is 180°. The clamp is also provided with a central clearance hole for the plug 70 connecting with the outer holes and is drilled to receive the thru bolts 72 which also extend thru the plug 70. To assemble, the clamp, plug and bolts are inserted into the crank chamber as a unit, the cylinder assemblies including the pistons and connecting rods are inserted and bolted into place and thereafter the crank ends are slid thru the connecting rods and into the clamp bores and firmly clamped together by means of the bolts 72. This construction greatly facilitates assembly, insures positive and perfect alignment of the two parts of the crank shaft, and has great rigidity because of the great force with which the clamp presses the ends of the cranks against the central or aligning plug 70. The subject matter of the assembled crankshaft feature of my invention is more fully described and is claimed in a separate application Serial No. 332,212 filed April 29, 1940.

Ignition for the cylinders is furnished preferably by separate ignition coils 40 for each cylinder supplied by the generator 73 to the breaker unit 41. The breaker unit and generator are driven at engine speed by the worm 74 engaging with the worm wheel 75 on the engine shaft. This arrangement insures a strong spark at high engine speeds and avoids the use of long high tension wires. The spark plugs are cooled by air blown from the cover housings 19 thru openings arranged around the plugs and so as to direct a stream of air against the body of the plugs. The generator is mounted over the blower housing and is also cooled with air supplied by the blower. The impeller blades are enclosed by an annular member 68 and the air entering the blower is cleaned by the filtering screen 69.

Among the many advantages arising from the use of my construction it may be well to mention the compactness and rigidity of the short crankshaft and engine, and the simplicity, quiet operation and light weight brought about by the elimination of poppet valves, cam shaft, gears, water cooling system, muffler, manifolds and the reduction in the number of cylinders. These advantages make my engine particularly suited for use in rear engined automobiles.

Some changes may be made in the arrangement, construction and combination of the various parts of my engine and one or more of the features disclosed herein may be used in other embodiments without departing from the spirit of my invention, and I desire to cover by my claims such changes and other embodiments which may reasonably be included within the scope thereof.

I claim as my invention:

1. In an air cooled internal combustion engine having a cylinder developing an exhaust gas, a chamber for a cooling air stream in heat conducting relation with said engine, an exhaust gas distributing chamber connected with the interior of said cylinder, and means associated with said air chamber and with said exhaust gas distributing chamber for impelling said cooling air stream by said exhaust gas, said means forming a series of closely spaced narrow ducts arranged flatwise side by side and thereby forming a series of streams from the cooling air chamber alternating with a series of intermediate streams from said exhaust gas chamber so that the exhaust gas streams act on opposite flat sides of said cooling air streams.

2. In an air cooled combustion engine having a cylinder developing an exhaust gas, a chamber for a cooling air stream in heat conducting relation with said engine, an exhaust gas distributing chamber connected with the interior of said cylinder, a mixing chamber receiving both the air stream and the exhaust gas, and means associated with said air chamber and with said exhaust gas distributing chamber for impelling said cooling air stream by said exhaust gas, said means forming a series of closely spaced narrow ducts arranged flatwise side by side and thereby forming a series of streams from the cooling air chamber alternating with a series of intermediate streams from said exhaust gas chamber so that the exhaust gas streams act on opposite flat sides of said cooling air streams.

ALFONS H. NEULAND.